(12) United States Patent
Wang et al.

(10) Patent No.: US 10,735,290 B2
(45) Date of Patent: Aug. 4, 2020

(54) NETWORK DEVICE FOR PROCESSING VARIOUS TYPES OF REQUESTS

(71) Applicant: Shanghai Zhaoxin Semiconductor Co., Ltd., Shanghai (CN)

(72) Inventors: Jingyang Wang, Beijing (CN); Wei Shao, Shanghai (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 0 days.

(21) Appl. No.: 16/364,204

(22) Filed: Mar. 26, 2019

(65) Prior Publication Data

US 2019/0306108 A1 Oct. 3, 2019

(30) Foreign Application Priority Data

Mar. 27, 2018 (CN) .......................... 2018 1 0258193
Mar. 30, 2018 (CN) .......................... 2018 1 0295222
Mar. 30, 2018 (CN) .......................... 2018 1 0298515

(51) Int. Cl.
H04L 12/26 (2006.01)
H04L 29/06 (2006.01)
H04L 29/12 (2006.01)
H04L 12/02 (2006.01)
H04L 12/70 (2013.01)

(52) U.S. Cl.
CPC .......... *H04L 43/0847* (2013.01); *H04L 12/02* (2013.01); *H04L 29/06* (2013.01); *H04L 61/103* (2013.01); *H04L 61/6009* (2013.01); *H04L 69/166* (2013.01); *H04L 69/22* (2013.01); *H04L 61/6022* (2013.01); *H04L 2012/5614* (2013.01)

(58) Field of Classification Search
CPC ................. H04L 12/02; H04L 12/4625; H04L 2012/5614; H04L 29/06; H04L 43/0847; H04L 61/103; H04L 61/6009; H04L 61/6022; H04L 69/166; H04L 69/22; H04L 69/321; H04L 69/324
See application file for complete search history.

(56) References Cited

U.S. PATENT DOCUMENTS

2004/0158640 A1* 8/2004 Philbrick ................ H04L 29/06
709/230
2005/0271015 A1* 12/2005 Nishida ............. H04W 36/0011
370/331

* cited by examiner

*Primary Examiner* — Kan Yuen
(74) *Attorney, Agent, or Firm* — JCIPRNET

(57) ABSTRACT

A network device for processing various types of requests is proposed. The network device may store segment information of the various types of requests by using different registers, thereby the reliability of the subsequently generated response can be improved while increasing the efficiency of implementing the ARP/NDP offloading.

20 Claims, 6 Drawing Sheets

NETWORK DEVICE FOR PROCESSING VARIOUS TYPES OF REQUESTS

CROSS-REFERENCE TO RELATED APPLICATION

This application claims the priority benefits of China application serial no. 201810295222.9, filed on Mar. 30, 2018, China application serial no. 201810298515.2, filed on Mar. 30, 2018, and China application serial no. 201810258193.9, filed on Mar. 27, 2018. The entirety of each of the above-mentioned patent applications is hereby incorporated by reference herein and made a part of this specification.

BACKGROUND OF THE INVENTION

Technical Field

The disclosure relates to a network device for processing requests. More particularly, the disclosure relates to a device capable of latching segment information in various types of requests by different registers, such as a network interface controller.

Description of Related Art

The address resolution protocol (ARP) is a 2-layered protocol based on the Internet protocol version 4 (IPv4). The address resolution processing is a process in which the target Internet Protocol (IP) address is resolved into the medium access control (MAC) address by a host before transmitting frames. According to the Ethernet protocol, when one host directly communicates with another host on the same local area network, the MAC address of the target host is required. In the transmission control protocol (TCP) and IP stacking, the network layer and the transport layer only concern the IP address of the target host. As such, when using the IP protocol in the Ethernet, only the IP address of the destination host is included in the data received by the Ethernet protocol of the data link layer from the upper layer IP protocol. The MAC address of the target host may be acquired according to the IP address of the destination host through using the address resolution protocol (ARP).

Taking a host A transmitting data to a host B as example, the host A looks for a target IP address in its own ARP cache table when transmitting data. The target MAC address is obtained when the host A finds the target IP address therein, and that the target MAC address may be written directly into a frame and then transmitted. If the target IP address is not found in the ARP cache table, the host A broadcasts an ARP request over the network, so as to query the MAC address of the host with the specific IP (i.e., the IP of the host B). Other hosts over the network do not respond to the ARP request. Not until receiving the frame does the host B respond to the host A (i.e., the ARP response). In this way, the host A obtains the MAC address of the host B and thereby is able to transmit data to the host B.

Simultaneously, the host A and the host B both update their own ARP cache tables. Hence, when trying to transmit data to each other, the host A and the host B may directly look for each other's MAC addresses in their own ARP cache tables.

The neighbor discovery protocol (NDP) is applicable to the Internet protocol version 6 (IPv6) and corresponds to the ARP used by the IPv4. Packets such as the neighbor discovery (ND) and the neighbor solicitation (NS) are present in the NDP. The implementation of the NDP is similar to that of the ARP for providing the function of address resolution. That is, when a host needs to acquire the MAC address of a target host on the same local area network, the host may transmit a NDP request (e.g., the Internet control message protocol version 6 (ICMPv6) message) to the target host. After receiving the NDP request, the target host may transmit associated NS response to the host, and the host and the target host caches this address pair.

Nevertheless, since a certain period of time is required for generating and transmitting the ARP/NS response, when a host continuously receives multiple ARP/NDP requests, the segment information being used to produce the ARP/NS response may be overwritten and thus the host may generate unreliable response. In this case, the unreliable response may be discarded, which affects the efficiency and reliability of the host responding to the ARP/NDP request.

BRIEF SUMMARY OF THE INVENTION

The disclosure provides a network device in which segment information in various types of address requests is cached through different registers, so as to increase reliability of subsequently generated responses and correspondingly improve efficiency of implementing ARP/NDP offloading.

In an embodiment of the disclosure, a network device for processing various types of requests is provided. The network device includes an address resolution module. The various types of requests include at least one first-type request and at least one second-type request. The address resolution module includes a first-type register group, a second-type register group, and a command queue. The first-type register group is configured for caching segment information in the first-type request. The second-type register group is configured for caching segment information in the second-type request. The command queue is configured for sequentially caching at least one first-type command related to the first-type request and at least one second-type command related to the second-type request. Each of the first-type command is configured for triggering the segment information in the corresponding first-type request to be sent from the first-type register group. Each of the second-type command is configured for triggering the segment information in the corresponding second-type request to be sent from the second-type register group. The first-type command and the second-type command are generated by the address resolution module and are cached in the command queue. An order of generating and caching the first-type command and the second-type command by the address resolution module is the order of receiving the first-type request and the second-type request by the address resolution module.

Based on the above, in the network device provided by the embodiments of the disclosure, the segment information of the first-type request and the second-type request are respectively latched in corresponding register group and are retrieved at an appropriate timing by the address resolution module, so as to correspondingly generate accurate and reliable first-type response or the second-type response.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF THE INVENTION

Figure 1:
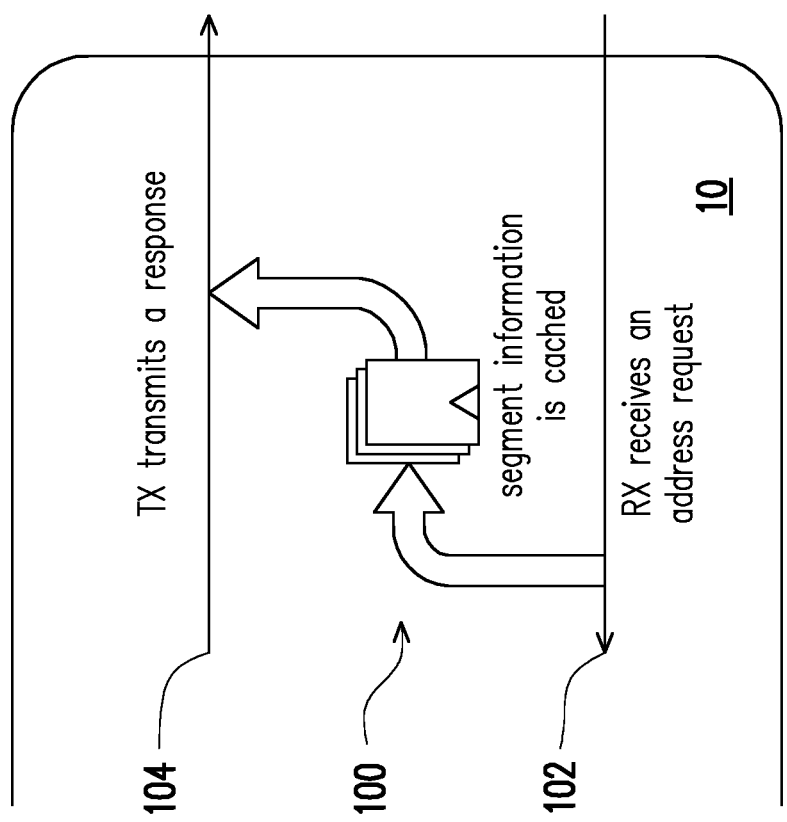
FIG. 1 is a schematic view of a network device according to an embodiment of the disclosure.

With reference to FIG. 1, FIG. 1 is a schematic view of a network device 10 according to an embodiment of the disclosure. Generally, the network device 10 of FIG. 1 includes an address resolution module 100 and further includes a receiving end (referred to as RX hereinafter) 102 and a transmitting end (referred to as TX hereinafter) 104 in an embodiment. The network device 10 may be a network interface controller (NIC), a host, or a chipset. In an embodiment, in order to ensure that the host may receive a request and make a corresponding response in a hibernation mode or sleep mode, the address resolution module 100, the receiving end (referred to as RX hereinafter) 102, and the transmitting end (referred to as TX hereinafter) 104 in FIG. 1 may be disposed in a suspend module of a gigabit NIC (GNIC), and specifically, in a gigabit MAC (GMAC) module of the suspend module.

To be specific, after RX 102 receives an address request, the address resolution module 100 may determine whether it needs to respond to the address request, and the address resolution module 100 extracts segment information in the address request if it needs to. The type of the address request may be a first-type request or a second-type request. The first-type request is, for example, an ARP request, and the second-type request is, for example, a NDP request, but the disclosure may not be limited herein.

The segment information includes, for example, a target IP address, a source IP address, and a source MAC address. The address resolution module 100 may cache the segment information. After the address request is received, the TX 104 receives a notification. The TX 104 then pops associated cached segment information and encapsulates the segment information together with local response information (e.g., a local MAC address, an Ethernet address, etc.) as a response for transmission. In the embodiments of the disclosure, the address request may be a first-type request or a second-type request. A response corresponding to the first-type request is a first-type response, and a response corresponding to the second-type request is a second-type response. In an embodiment, the TX 104 may correspondingly generate an ARP response if the first-type request is the ARP request, and the TX 104 may correspondingly generate a NS response if the second-type request is the NDP request, but the disclosure may not be limited herein.

Nevertheless, under a structure depicted in FIG. 1, if the RX 102 continuously receives a plurality of first-type requests and/or a plurality of second-type requests, the segment information in these requests appearing later may overwrite the segment information being used to produce response. As such, the response may be unreliable. If the segment information being used to produce response is overwritten by the segment information of the request appearing later, the response is highly likely unreliable. The unreliable responses may be finally discarded, which affects the efficiency of the network device 10 of offloading a request. Such situation is described below with reference to FIG. 2.

Figure 2:
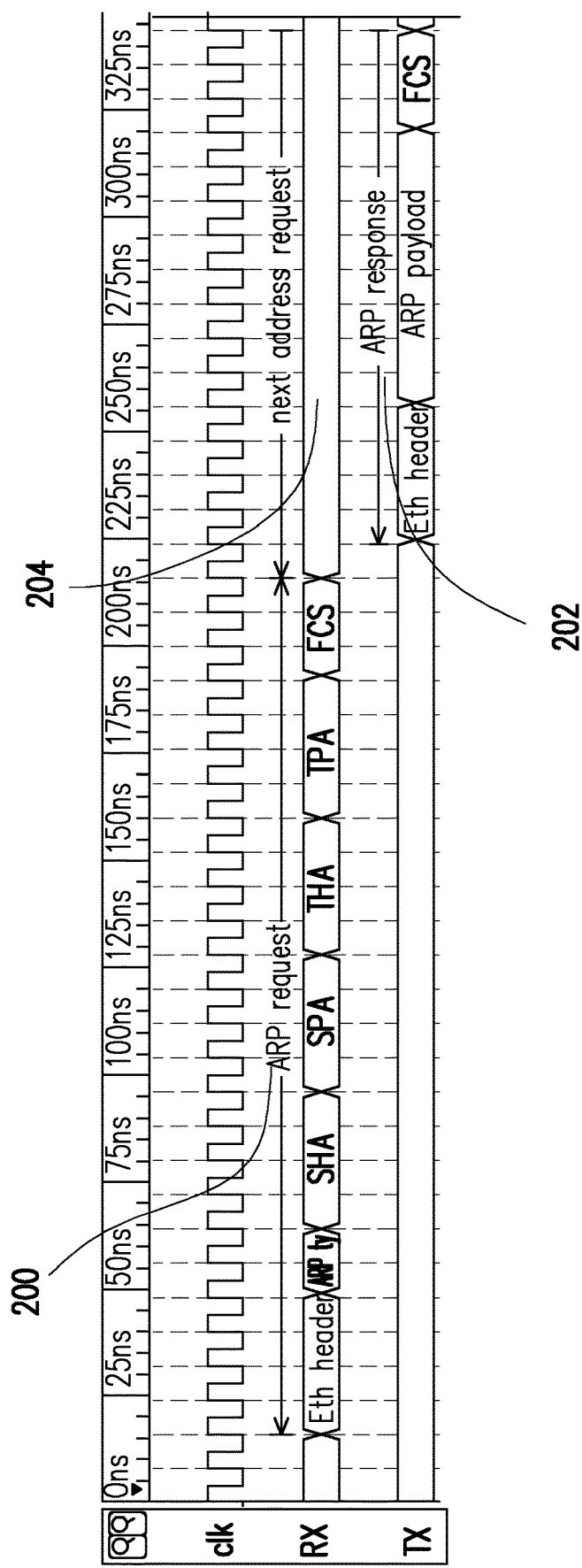
FIG. 2 is a transmission timing diagram according to an embodiment of the disclosure.

With reference to FIG. 2, FIG. 2 is a transmission timing diagram according to an embodiment of the disclosure. In this embodiment, it is assumed that the RX 102 receives an ARP request 200, wherein the length of the ARP request 200 is 64 bytes. Generally, an effective payload of the ARP request 200 includes a source protocol address (SPA), a source hardware address (SHA), a target protocol address (TPA), and a target hardware address (THA), while an ARP response is correspondingly generated based on the SPA, the THA, and the TPA. Additionally, the SPA, the THA, and the TPA may be configured for determining whether the ARP request 200 is indeed used for querying a MAC address of the host to which the address resolution module 100 belongs.

In this embodiment, it is assumed that the ARP request 200 is indeed used for querying the MAC address of the host to which the address resolution module 100 belongs, and a SPA (source protocol address) segment in the ARP request and a TPA (target protocol address) are both identical to a value transmitted by an upper layer driver of the host receiving the ARP request. When the TX 104 generates an ARP response 202, in addition to the MAC address (i.e., the local MAC address) of the host to which the address resolution module 100 belongs, the SHA in the ARP request 200 acting as an payload of the ARP response 202 is also transmitted to a transmitting bus (a TX bus) after packaged.

As shown in FIG. 2, in a process in which the TX 104 transmits the ARP response 202, if the RX 102 requires to receive a next address request 204 during transmitting operations, the generation of the ARP response 202 may not be affected by the next address request 204.

In addition, the RX 102 may receive a NDP request having a longer length (a longest NDP request may be up to 110 bytes) prior to receiving the ARP request. In this case, since a response time of the TX 104 responding to the NDP request is significantly long, in a process in which the TX 104 responds to the NDP request, the RX 102 may receive one or more ARP requests. However, the segment information, cached by the address resolution module 100, of the NDP request is overwritten by the segment information in the ARP request. As such, the TX 104 may not produce a reliable NS response. Accordingly, the disclosure provides another network device structure to solve the foregoing technical problem.

Figure 3A:
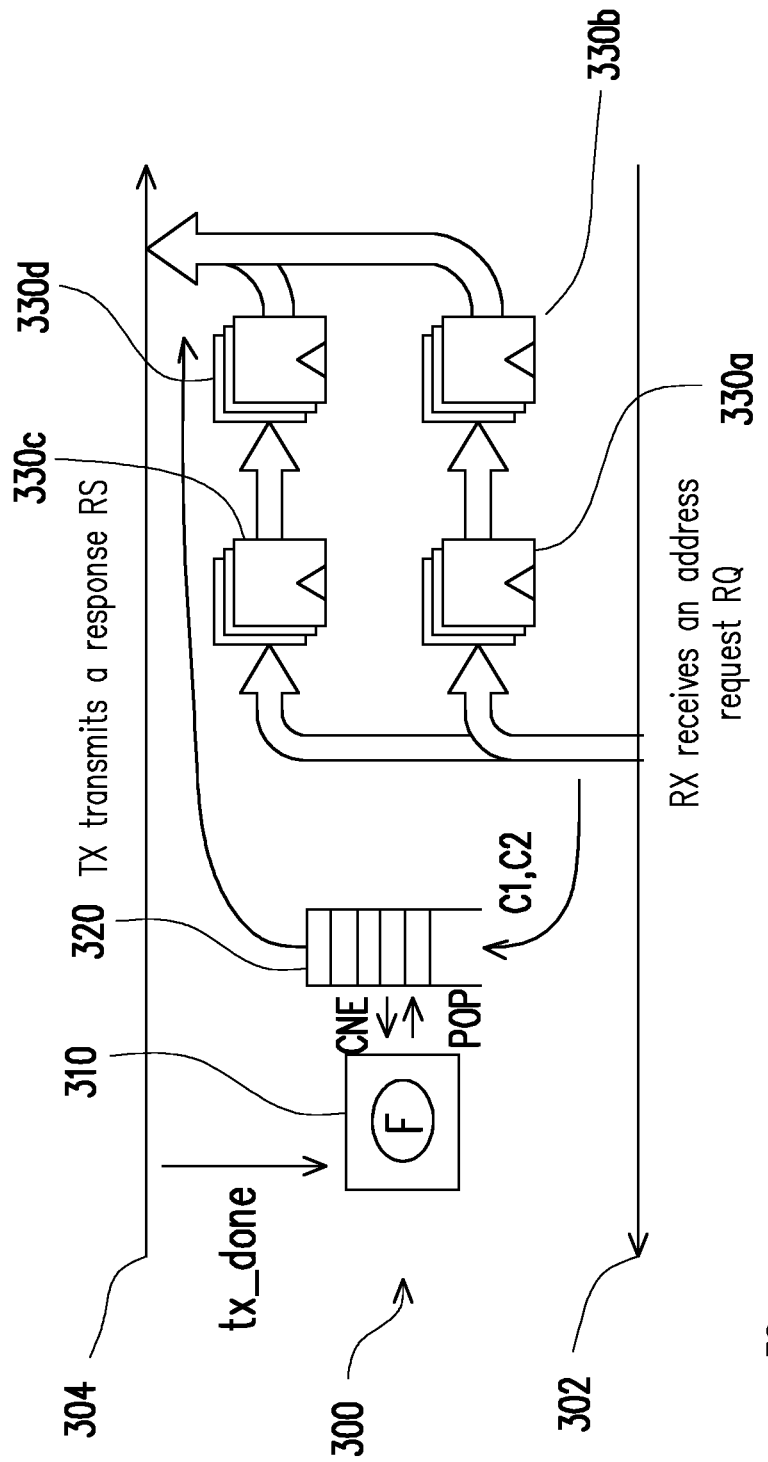
FIG. 3A is a schematic view of a network device according to an embodiment of the disclosure.

With reference to FIG. 3A, FIG. 3A is a schematic view of a network device according to an embodiment of the disclosure. In FIG. 3A, a network device 30 includes an address resolution module 300, a RX 302 and a TX 304 therein. Similar to the embodiment described in FIG. 1, the RX 302 is coupled to the address resolution module 300, and the address resolution module 300 is also coupled to the TX 304. The address resolution module 300, the RX 302, and the TX 304 may be disposed in a GMAC module of a suspend module of the network device 30 for generating a corresponding response RS after receiving an address request RQ, but the disclosure may not be limited herein. In an embodiment, the address resolution module 300, the RX 302, and the TX 304 may be disposed in different modules. For instance, the address resolution module 300 is disposed in the GMAC module, and the RX 302 and the TX 304 are disposed outside the GMAC module.

As shown in FIG. 3A, the address resolution module 300 includes a state machine 310, a command queue 320, a first register 330a, a second register 330b, a third register 330c, and a fourth register 330d. The first register 330a and the second register 330b are serially coupled to each other and may be generally called as a first-type register group for caching the required-to-be-cached segment information in the first-type request, wherein the first-type request may be the ARP request. The third register 330c and the fourth register 330d are serially coupled to each other and may be generally called as a second-type register group for caching the required-to-be-cached segment information in the second-type request, wherein the second-type request may be the NDP request, but the disclosure may not be limited herein. For instance, the address resolution module 300 may include a control module instead of including the state machine 310 in an embodiment, and the control module can implement all the functions the state machine 310 provides. The control module may be implemented by combinational circuits (i.e., by H/W), S/W (e.g., the driver for controlling the address resolution module 300), the combinations of S/W and H/W, or the program stored in private storage and accessed by the module which the address resolution module 300 was embedded therein. In an embodiment, the second-type register group may include only one register (e.g., include only the third register 330c or the fourth register 330d).

In this embodiment, the address resolution module 300 determines whether a response is required for the address request. If no response is required for the address request, the address resolution module 300 may discard the address request. If it is necessary to generate a response for the address request, the address resolution module 300 further determines whether the address request RQ is the first-type request or the second-type request and extracts the segment information in the address request RQ. For instance, in the ARP request, the segment information may include the target IP address, the source IP address, the target MAC address, and the source MAC address. In an embodiment, the address resolution module 300 may determine whether the address request is the first-type request or the second-type request according to an Ethernet length/type segment of the address request.

When the address request is the first-type request, (e.g., the ARP request) the address resolution module 300 stores the required-to-be-cached segment information in the first-type request to the first-type register group, and the address resolution module 300 produces a first-type command C1 corresponding to the address request to the command queue 320. When the address request is the second-type request, the address resolution module 300 stores the required-to-be-cached segment information in the second-type request to the second-type register group, and the address resolution module 300 produces a second-type command C2 corresponding to the address request to the command queue 320. The first-type command C1 and the second-type command C2 may be generally called as a request command, while the first-type command C1 and the second-type command C2 are generated by the address resolution module 300 and are cached in the command queue 320. Herein, an order of generating the first-type command C1 and the second-type command C2 by the address resolution module 300 is the order of receiving the first-type request and the second-type request by the address resolution module 300, and the order of caching the first-type command C1 and the second-type command C2 in the command queue 320 also indicates the order of receiving the corresponding requests by the address resolution module 300. In addition, the request commands may be configured for registering type information corresponding to the requests, including the first-type request and the second-type request. In an embodiment, when the address request RQ is the first-type request, the segment information may be stored to the first register 330a and then cached to the second register 330b by the address resolution module 300. When the address request RQ is the second-type request, the segment information in the second-type request may be stored to the third register 330c and then cached to the fourth register 330d by the address resolution module 300. The command queue 320 is configured for sequentially caching and popping the request commands corresponding to the address request and for ensuring that the first-type register group and the second-type register group may send the cached segment information to the TX 304 according to the order of receiving the segment information in the first-type request and the second-type. The command queue 320 may be a first-in-first-out queue but may not be limited herein.

To be specific, the TX 304 may select the cached segment information from the second register 330b or from the fourth register 330d according to the type information of the requests included in the request commands sequentially received. For instance, when the type information of the request command received by the TX 304 is the first-type command C1, the TX 304 may retrieve the segment information from the first-type register group (e.g., the second register 330b) to produce the response RS (e.g., the first-type response). When the type information of the request command received by the TX 304 is the second-type command C2, the TX 304 may retrieve the segment information from the second-type register group (e.g., the fourth register 330d) to produce the response RS (e.g., the second-type response). Specifically, that the TX 304 retrieves the cached segment information from the second register 330b or the fourth register 330d depends on the type information included in the request commands.

Figures 3B, 3C:
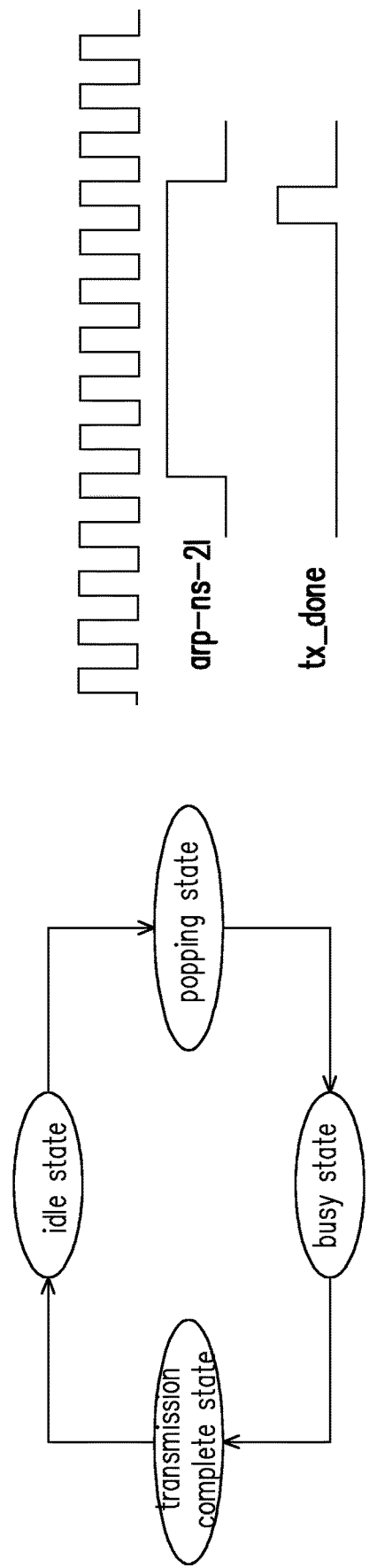
FIG. 3B is a schematic diagram of an operational state of a state machine according to an embodiment of the disclosure.
FIG. 3C is a schematic diagram of a state signal according to an embodiment of the disclosure.

Please now refer to FIG. 3B, which is a schematic diagram of an operational state of a state machine according to an embodiment of the disclosure. In this embodiment, the state machine 310 may operate among an idle state, a popping state, a busy state, and a transmission complete state but may not be limited to the above. For instance, in an embodiment, the state machine 310 may operate between the idle state and the busy state only. In this embodiment, the state machine 310 may be configured to manage the caching and/or transmitting operations of the segment information in the request cached in the register. To be specific, when no request command is cached in the command queue 320, the state machine 310 is in the idle state. When the command queue 320 caches a request command, the state machine 310 receives a non-empty state indication CNE transmitted by the command queue 320 and then switches to the popping state. When the TX 304 begins to receive the segment information cached in the register (e.g., from the second register 330b or the fourth register 330d) to produce associated response corresponding to the request, the state machine 310 switches to the busy state. After the TX 304 has transmitted the response completely, the state machine 310 switches to the transmission complete state. After the address resolution module 300 determines the address request is the first-type request and cached the segment information in the first-type request in the first register 330a, one cycle later, the segment information located in the first register 330a will be cached in the second register 330b if the second register 330b is overwritable (the state machine 310 is in the idle state at this moment). In an embodiment, after the RX 302 receives the address request RQ, the RX 302 may produce and transmit a first reception completion signal to the address resolution module 300. After receiving the first reception completion signal, the address resolution module 300 caches the segment information in the address request RQ in the first register 330a. One cycle later, a second reception completion signal (referred to as arp_ns_rcv_end hereinafter) may be produced based on the first reception completion signal. When the state machine 310 is in the idle state and the arp_ns_rcv_end signal is asserted, the segment information located in the first register 330a may be moved to the second register 330b but may not be limited herein.

After the first-type command C1 is pushed into the command queue 320, the command queue 320 may send one non-empty state indication CNE to the state machine 310 for triggering the state machine 310 to switch from the idle state to the popping state. When the state machine 310 is in the popping state, the state machine 310 may send a popping command POP for triggering the command queue 320 to pop the first-type command C1 to the TX 304. The state machine 310 may switch from the popping state to the busy state.

Afterwards, the TX 304 may retrieve the segment information from the second register 330b according to the first-type command C1 and accordingly produces the response RS (i.e., the first-type response). After the first-type response has been transmitted completely, the TX 304 accordingly transmits a completion signal tx_done to the state machine 310, so as to trigger the state machine 310 to switch from the busy state to the transmission complete state and then switch to the idle state. In an embodiment, the TX 304 receives the segment information from the second register 330b and accordingly produces the first-type response. When the segment information from the second register 330b is received completely, the TX 304 generates the completion signal tx_done.

In an embodiment, after the address request RQ is determined as the first-type request and the segment information in the first-type request is extracted and cached to the first register 330a, if the state machine 310 is in the busy state, the segment information located in the first register 330a may be held in the first register 330a. That is, the segment information is not moved into the second register 330b, so as to prevent the segment information from overwriting the segment information which is currently cached in the second register 330b and required for producing the response RS by the TX 304 at this moment. To be specific, when the state machine 310 is in the busy state, the TX 304 is producing associated response for the first-type request according to the segment information in the first-type request located in the second register 330b currently. If the segment information cached in the first register 330a is moved to the second register 330b at this moment, the accuracy of the response produced corresponding to the first-type request by the TX 304 at the moment is likely to be affected. In another embodiment, after the address request RQ is determined as the first-type request, if the TX 304 is transmitting another response, the segment information located in the first register 330a may be held in the first register 330a. After this another response is transmitted by the TX 304 completely, the segment information located in the first register 330a may be moved to the second register 330b. Details are further described below with reference to FIG. 3C.

With reference to FIG. 3C, FIG. 3C is a schematic diagram of a state signal according to an embodiment of the disclosure. In FIG. 3C, after transmitting a response, the TX 304 produces and transmits the completion signal tx_done to the address resolution module 300, and specifically, maybe the state machine 310, but the disclosure is not limited herein. The TX 304 may also transmit the completion signal tx_done to the first register 330a and/or the third register 330c. In this embodiment, when the RX 302 has received a new address request RQ while the TX 304 is transmitting another response, the address resolution module 300 may produce a signal arp-ns-21. As shown in FIG. 3C, when the completion signal tx_done and the signal arp-ns-21 are asserted at the same time (e.g., both are at the state "High" as shown in FIG. 3C), it represents the transmission of this another response is completed by the TX 304. As such, the segment information located in the second register 330b currently is no longer required. Therefore, the segment information located in the first register 330a is moved to the second register 330b.

In another embodiment, one cycle later when the address resolution module 300 determines the address request as the second-type request and cached the segment information in the second-type request in the third register 330c, if the fourth register 330d is overwritable (e.g., may be determined by observing whether the state machine 310 is in the idle state), the state machine 310 controls the segment information in the third register 330c to be cached in the fourth register 330d. Similar to the description of the foregoing embodiment, when the state machine 310 is in the idle state and the arp_ns_rcv_end signal is asserted, the segment information located in the third register 330c may be moved to the fourth register 330d but may not be limited to the above.

Moreover, after the second-type command C2 is pushed into the command queue 320, the command queue 320 may transmit the non-empty state indication CNE to the state machine 310 for triggering the state machine 310 to switch from the idle state to the popping state. When the state machine 310 is in the popping state, the state machine 310 may transmit the popping command POP to inform the command queue 320 of popping the second-type command C2 to the TX 304 and then the state machine 310 may switch from the popping state to the busy state.

Afterwards, the TX 304 may retrieve the segment information from the fourth register 330d according to the second-type command C2 received by the TX 304 and accordingly produces the second-type response. After transmitting the second-type response, the TX 304 correspondingly transmits the completion signal tx_done to the state machine 310, so as to trigger the state machine 310 to switch from the busy state to the transmission complete state and then switch to the idle state. In an embodiment, the TX 304 receives the segment information from the fourth register 330d and accordingly produces the second-type response. After the segment information from the fourth register 330d is received completely, the TX 304 generates the completion signal tx_done.

In an embodiment, after the address request RQ is determined as the second-type request and the segment information in the second-type request is cached into the third register 330c. If the state machine 310 is now in the busy state, the segment information located in the third register 330c may be held in the third register 330c, which indicates the segment information is not moved to the fourth register 330d so as to prevent the TX 304 operation at the moment from being affected. To be specific, when the state machine 310 is in the busy state, which means that the TX 304 may be producing the response corresponding to the second-type request according to the segment information in the second-type request located in the fourth register 330d at the moment. If the segment information cached in the third register 330c is moved to the fourth register 330d now, which may affect the accuracy of the response being currently produced corresponding to the second-type request by the TX 304.

In another embodiment, after the address request RQ is determined as the second-type request, if the TX 304 is producing or transmitting another response, the segment information located in the third register 330c may be hold in the third register 330c. After this another response is transmitted by the TX 304 completely, the segment information located in the third register 330c may be moved to the fourth register 330d. Details of the above have been specified in the description of FIG. 3C and therefore will not repeat hereinafter.

In an embodiment, when the TX 304 is producing or transmitting the second-type response, the RX 302 may have received a first address requests and a second address request, already. Among them, the first address request is prior to the second address request, and the first address request and the second address request are both the first-type requests. In this case, the first-type register group and the second-type register group are configured for respectively caching the first-type request and the second-type request in the embodiments of the disclosure. Further, the first-type register group is configured to be a two-level cache structure in the embodiments of the disclosure. That is, the first-type register group includes the first register 330a and the second register 330b (the segment information of the first address request and the second address request is now stored in the first register 330a and the second register 330b, respectively) for ensuring that the address resolution module 300 of the embodiments of the disclosure may still instantly and precisely store the segment information in plural first-type requests while the TX 304 is producing or transmitting the second-type response and the RX 302 continuously is receiving plural first-type requests. Hence, the TX 304 is ensured to accurately, effectively, and reliably generate and transmit plural first-type responses corresponding to the plural first-type requests.

Figure 4:
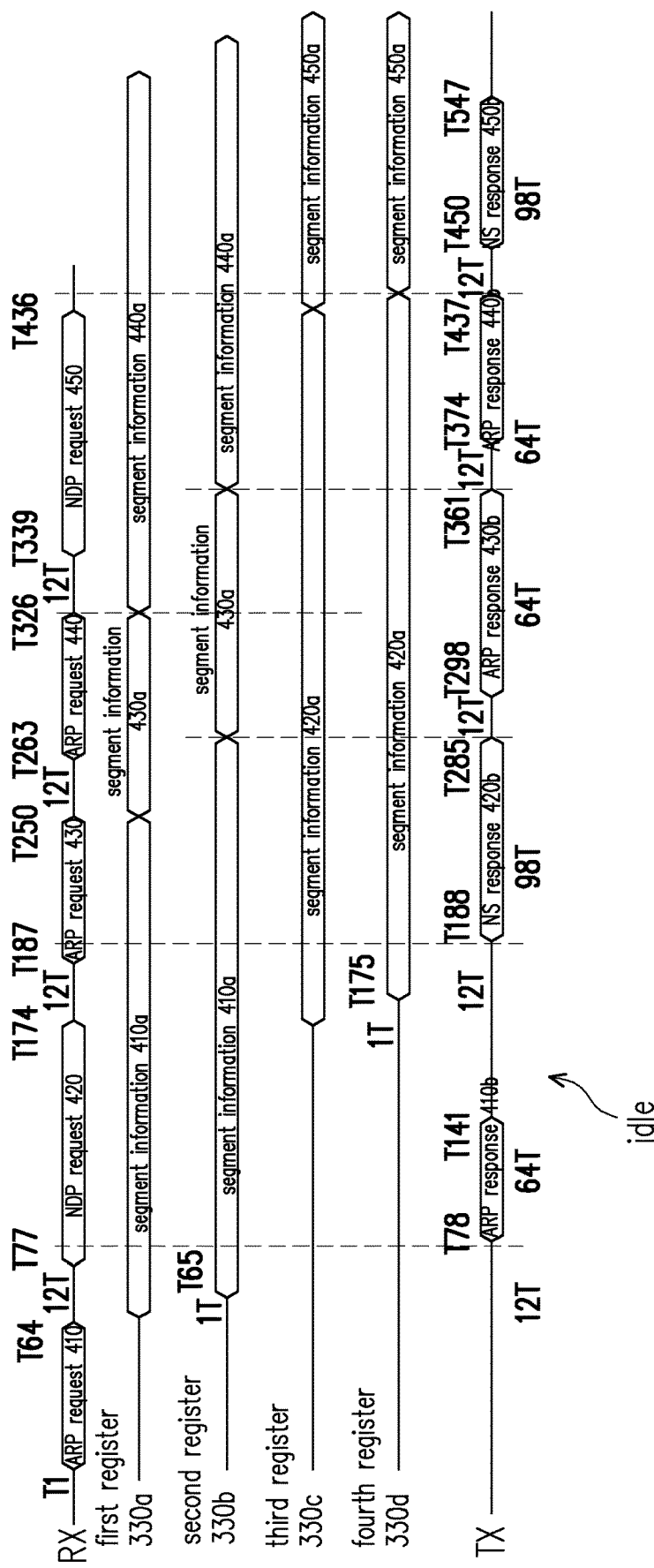
FIG. 4 is a transmission timing diagram according to an embodiment of the disclosure.

With reference to FIG. 4, FIG. 4 is a transmission timing diagram according to an embodiment of the disclosure. For clarity of the diagram, in FIG. 4, T represents the cycle, and Tk represents the kth cycle. For instance, T1 represents the $1^{st}$ cycle, and T64 represents the $64^{th}$ cycle, and so on so forth.

In this embodiment, the RX 302 is assumed to successively receive an ARP request 410, an NDP request 420, an ARP request 430, an ARP request 440, and an NDP request 450 transmitted from different hosts. Among them, it is assumed that a minimum request interval is present between each of the requests and each of the responses. For example, a 12-cycle interval is present between two adjacent requests and responses. At the beginning, the register 330a-330d are all overwritable. According to the teaching described in the foregoing embodiments, after the ARP request 410 is determined, segment information 410a in the ARP request 410 may be stored in the first register 330a. Moreover, the segment information 410a may be moved to the second register 330b in the next cycle after being stored in the first register 330a. Next, after the segment information 410a is stored to the second register 330b, the TX 304 may start to generate associated ARP response 410b according to the segment information 410a and then sends the ARP response 410b through the transmitting bus at the thirteenth cycle.

In addition, after the NDP request 420 is determined, segment information 420a in the NDP request 420 may be stored in the third register 330c. Moreover, the segment information 420a may be moved to the fourth register 330d in the next cycle after being stored in the third register 330c. Next, after the segment information 420a is stored to the fourth register 330d, the TX 304 may start to generate associated NS response 420b according to the segment information 420a and then sends the NS response 420b through the transmitting bus at the thirteenth cycle.

Similarly, after the ARP request 430 is determined, segment information 430a of the ARP request 430 may be stored in the first register 330a. After the NS response 420b is transmitted by the TX 304 completely, the segment information 430a may be moved from the first register 330a to the second register 330b.

Note that before the reception of the ARP request 430 is completed by the RX 302, the segment information 410a may be kept in the first register 330a. Before the transmission of the NS response 420b is completed, the segment information 410a may be kept in the second register 330b, but the disclosure is not limited herein. For instance, in an embodiment, when the segment information 410a is moved from the first register 330a to the second register 330b, the segment information 410a cached in the first register 330a may be cleared. After the ARP response 410b is transmitted by the TX 304, the segment information 410a cached in the second register 330b may be cleared.

Since the address resolution module 300 not only includes the first-type register group but the second-type register group, when the TX 304 produces and transmits the NS response 420b based on the segment information 420a cached in the second-type register group (e.g., the fourth register 330d), the segment information 430a may be completely cached in the first-type register group (e.g., the first register 330a or 330b). Hence, after transmitting the NS response 420b, the TX 304 may still generate accurate, valid, and reliable ARP response 430b. As such, the NS response 420b is not discarded, so as to improve the efficiency while the address resolution module 300 processes the request.

According to the teaching described above, after the ARP request 440 is determined, segment information 440a in the ARP request 440 may be stored in the first register 330a. Since the transmission of the ARP response 430b is not completed at the moment, the segment information 440a may be kept in the first register 330a. After the transmission of the ARP response 430b is completed and then the segment information 440a is moved from the first register 330a to the second register 330b, the TX 304 may start to generate the ARP response 440b according to the segment information 440a in the second register 330b and sends the ARP response 440b through the transmitting end bus starting from the thirteenth cycle.

Similar to the teaching described above, since the segment information 430a cached in the first register 330a may not be overwritten, the TX 304 may still generate accurate, effective, and reliable ARP response 430b even if at the moment the TX 304 is transmitting the ARP response 430b but the RX 302 is receiving the ARP request 440. As such, the ARP response 430b is not discarded so as to improve the efficiency of the address resolution module 300 in processing address requests.

In addition, after the NDP request 450 is determined, segment information 450a in the NDP request 450 may be stored in the third register 330c. When the ARP response 440b is completely transmitted by the TX 304, the segment information 450a may be moved from the third register 330c to the fourth register 330d. Next, starting from the thirteenth cycle after the segment information 450a is stored in the fourth register 330d, the TX 304 may start to generate the NS response 450b according to the segment information 450a and then sends a NS response 450b through the transmitting bus.

In FIG. 4, the NDP request is 98 bytes. But in an extreme case, the maximum length of the NDP request may be 110 bytes, which is a form including the NS, the virtual local area network (VLAN), and the subnetwork access protocol (SNAP). In this case, the address resolution module 300 provided by the embodiments of the disclosure may overcome defects in conventional technologies and further increase the efficiency of the address resolution module 300 during processing the address requests. Details are further described below with reference to FIG. 5.

Figure 5:
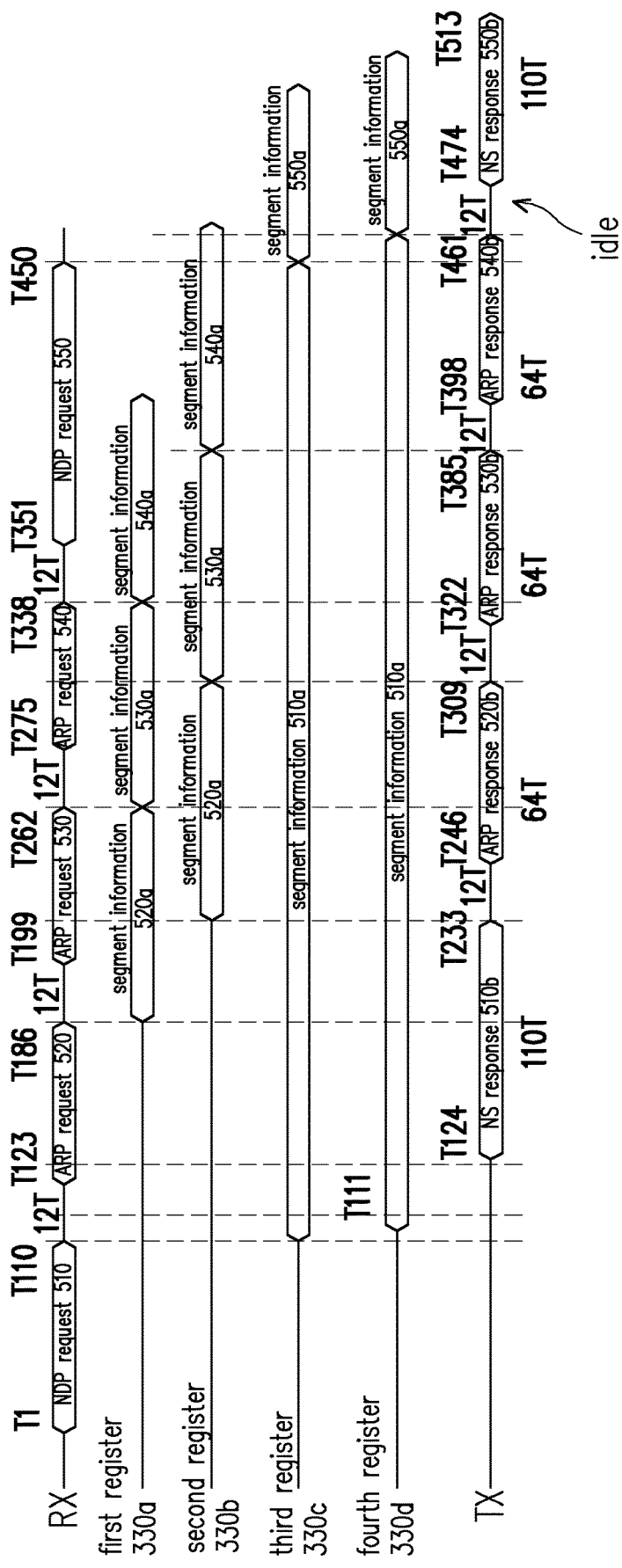
FIG. 5 is a transmission timing diagram according to another embodiment of the disclosure.

With reference to FIG. 5, FIG. 5 is a transmission timing diagram according to another embodiment of the disclosure. In this embodiment, the RX 302 is assumed to successively receive a NDP request 510, an ARP request 520, an ARP request 530, an ARP request 540, and a NDP request 550 transmitted from different hosts, wherein the NDP request has a length in an extreme case. For the sake of clarity, in FIG. 5, T also represents the cycle, and Tk represents the kth cycle. For instance, T1 represents the $1^{st}$ cycle, and T110 represents a $110^{th}$ cycle, and so on and so forth.

At the beginning, the state machine 310 is in the idle state. According to the teaching described in the foregoing embodiments, after the NDP request 510 is determined, segment information 510a in the NDP request 510 may be stored in the third register 330c. Moreover, the segment information 510a may be moved to the fourth register 330d in the next cycle after being stored in the third register 330c. Next, starting from the thirteenth cycle after the segment information 510a is stored to the fourth register 330d, the TX 304 may start to generate associated NS response 510b according to the segment information 510a and then sends the NS response 510b through the transmitting bus.

Specifically, after the RX 302 receives the NDP request 510 completely, the RX 302 may transmit the first reception completion signal to the address resolution module 300. The address resolution module 300 may store the segment information 510a in the NDP request 510 into the third register 330c and pushes the second-type command C2_510 related to the NDP request 510 into the command queue 320. One cycle after the NDP request 510 has been received completely, the address resolution module 300 may correspondingly produce the second reception completion signal arp_ns_rcv_end according to the first reception completion signal. If the state machine 310 is not in the busy state at this time, the state machine 310 controls the segment information 510a in the third register 330c to be moved from the third register 330c to the fourth register 330d.

Since the second-type command C2_510 related to the NDP request 510 is cached in the command queue 320, the command queue 320 may send a non-empty state indication CNE to the state machine 310 to activate the state machine 310 to switch from the idle state to the popping state. At this time, the state machine 310 may transmit the popping command POP which triggers the command queue 320 to pop the second-type command C2_510 and deliver to the TX 304, and the state machine 310 then switches from the popping state to the busy state. The TX 304 may retrieve the segment information 510a from the fourth register 330d according to the second-type command C2_510 to produce the NS response 510b. After transmitting the NS response 510b, the TX 304 correspondingly transmits the completion signal tx_done to the state machine 310, so as to trigger the state machine 310 to switch from the busy state to the transmission complete state and then switch to the idle state.

As shown in FIG. 5, when the TX 304 transmits the NS response 510b, the RX 302 receives the ARP request 520 at the same time. After the RX 302 has received the ARP request 520, the RX 302 may transmit the first reception completion signal to the address resolution module 300. The address resolution module 300 may store the segment information 520a in the ARP request 520 into the first register 330a and pushes the first-type command C1_520 related to the ARP request 520 into the command queue 320. One cycle after the ARP request 520 has been received, the address resolution module 300 correspondingly produces the second reception completion signal arp_ns_rcv_end according to the first reception completion signal. Since the state machine 310 is in the busy state at this time, the segment information 520a in the first register 330a may be held in the first register 330a.

When the RX 302 has received the ARP request 520 and the TX 304 is transmitting the NS response 510b, that is, the state machine 310 is in the busy state, the address resolution module 300 may produce one signal arp-ns-21 and the RX 302 may start to receive the ARP request 530 at T199. After transmitting the NS response 510b completely at T233 (the RX 302 is receiving the ARP request 530 now), the TX 304 transmits the completion signal tx_done to the address resolution module 300. At this time point, the completion signal tx_done and the signal arp-ns-21 are both asserted in the address resolution module 300, and the segment information 520a located in the first register 330a may be moved to the second register 330b.

After receiving the completion signal tx_done, the state machine 310 sequentially switches to the transmission complete state and the idle state. Nevertheless, since the first-type command C1_520 related to the ARP request 520 is present in the command queue 320, the command queue 320 may send a non-empty state indication CNE to the state machine 310 to inform the state machine 310 of switching from the idle state to the popping state. When the state machine 310 is in the popping state, the state machine 310 may transmit a popping command POP to activate the command queue 320 to pop and deliver the first-type command C1_520 related to the ARP request 520 to the TX 304, and then the state machine 310 switches from the popping state to the busy state. The TX 304 may retrieve the segment information 520a from the second register 330b according to the first-type command C1_520 related to the ARP request 520 for producing the ARP response 520b, and then start to transmit the ARP response 520b.

After the RX 302 has received the ARP request 530, the RX 302 may transmit the first reception completion signal to the address resolution module 300. The address resolution module 300 may store the segment information 530a in the ARP request 530 into the first register 330a and pushes the first-type command C1_530 related to the ARP request 530 into the command queue 320. One cycle after the ARP request 520 has been received, the address resolution module 300 correspondingly produces the second reception completion signal arp_ns_rcv_end according to the first reception completion signal. Since the state machine 310 is in the busy state at this time, the segment information 530a in the first register 330a may be held in the first register 330a. When the RX 302 has received the ARP request 530 and the TX 304 is transmitting the ARP response 520b, that is, the state machine 310 is in the busy state, the address resolution module 300 may produce one signal arp-ns-21 and the RX 302 may start to receive the ARP request 540 at T275.

As known from the above, the segment information 530a may be kept in the first register 330a without overwriting the second register 330b before the transmission of the ARP response 520b is completed. After the transmission of the ARP response 520b is completed by the TX 304, the segment information 530a stored in the first register 330a may be moved to the second register 330b from the first register 330a, so as to prevent the segment information 520a in the second register 330b from being overwritten during the transmission of the ARP response 520b. The TX 304 then send the ARP response 520b through the transmitting bus accurately, effectively, and reliably.

After completely transmitting the ARP response 520b, the TX 304 correspondingly transmits the completion signal tx_done to the state machine 310, so as to trigger the state machine 310 to switch from the busy state to the transmission complete state and then switch to the idle state. At this time point, the completion signal tx_done and the signal arp-ns-21 are both asserted in the address resolution module 300, and the segment information 530a located in the first register 330a may be moved to the second register 330b. Nevertheless, since the first-type command C1_530 related to the ARP request 530 is present in the command queue 320, the command queue 320 may send a non-empty state indication CNE to the state machine 310 to inform the state machine 310 of switching from the idle state to the popping state. When the state machine 310 is in the popping state, the state machine 310 may transmit a popping command POP to activate the command queue 320 to pop and deliver the first-type command C1_530 related to the ARP request 530 to the TX 304, and then the state machine 310 switches from the popping state to the busy state. The TX 304 may retrieve the segment information 530a from the second register 330b according to the first-type command C1_530 related to the ARP request 530 for producing the ARP response 530b, and then start to transmit the ARP response 530b.

When the TX 304 is transmitting the ARP response 530b, the RX 302 is receiving the ARP request 540 simultaneously. After the RX 302 receives the ARP request 540 completely, the RX 302 may transmit the first reception completion signal to the address resolution module 300. The address resolution module 300 may store the segment information 540a in the ARP request 540 into the first register 330a and pushes the first-type command C1_540 related to the ARP request 540 into the command queue 320. One cycle after the ARP request 540 has been received completely, the address resolution module 300 correspondingly produces the second reception completion signal arp_ns_rcv_end according to the first reception completion signal. Since the state machine 310 is in the busy state at this time (i.e., the TX 304 is producing and transmitting the ARP response 530b based on the segment information 530a retrieved from the second register 330b), the segment information 540a in the first register 330a may be held in the first register 330a (without overwriting the second register 330b).

As described in the foregoing embodiments, when the RX 302 has received the ARP request 540 and the TX 304 is transmitting the ARP response 530b, the address resolution module 300 may generate a signal arp-ns-21. After transmitting the ARP response 530b completely, the TX 304 transmits the completion signal tx_done to the address resolution module 300. At this moment, the completion signal tx_done and the signal arp-ns-21 are both asserted in the address resolution module 300, and that the segment information 540a located in the first register 330a may be moved to the second register 330b.

After receiving the completion signal tx_done, the state machine 310 sequentially switches to the transmission complete state and the idle state. Nevertheless, since the first-type command C1_540 related to the ARP request 540 is present in the command queue 320, the command queue 320 may transmit the non-empty state indication CNE to the state machine 310 for activating the state machine 310 to switch from the idle state to the popping state. When the state machine 310 is in the popping state, the state machine 310 may transmit the popping command POP for triggering the command queue 320 to pop the first-type command C1_540 related to the ARP request 540 to the TX 304, and then the state machine 310 switches from the popping state to the busy state. The TX 304 may retrieve the segment information 540a from the second register 330b based on the first-type command C1_540 related to the ARP request 540 for producing the ARP response 540b. After transmitting the ARP response 540b, the TX 304 correspondingly transmits the completion signal tx_done to the state machine 310, so as to trigger the state machine 310 to switch from the busy state to the transmission complete state and then switch to the idle state.

As known from the above, the segment information 540a may be kept in the first register 330a without overwriting the second register 330b before the transmission of the ARP response 530b is completed. After the transmission of the ARP response 530b is completed by the TX 304, the segment information 540a stored in the first register 330a may be moved to the second register 330b from the first register 330a, so as to prevent the segment information 530a in the second register 330b from being overwritten. Generally, the TX 304 send the ARP response 530b through the transmitting bus accurately, effectively, and reliably.

When the TX 304 is transmitting the ARP response 540b, the RX 302 is receiving the NDP request 550 simultaneously. After the RX 302 receives the NDP request 550 completely, the RX 302 may transmit the first reception completion signal to the address resolution module 300. The address resolution module 300 may store the segment information 550a in the NDP request 550 into the third register 330c and pushes the second-type command C2_550 related to the NDP request 550 into the command queue 320. One cycle after the NDP request 550 has been received completely, the address resolution module 300 correspondingly produces the second reception completion signal arp_ns_rcv_end according to the first reception completion signal. Since the state machine 310 is in the busy state at this time (i.e., the TX 304 is producing and transmitting the ARP response 540b based on the segment information 540a retrieved from the second register 330b), the segment information 550a in the third register 330c may be held in the third register 330c (without overwriting the second register 330b).

As described in the foregoing embodiments, when the RX 302 has received the NDP request 550 and the TX 304 is transmitting the ARP response 540b, the address resolution module 300 may produce one signal arp-ns-21. After transmitting the ARP response 540b completely, the TX 304 transmits the completion signal tx_done to the address resolution module 300. At this moment, the completion signal tx_done and the signal arp-ns-21 are both asserted in the address resolution module 300, and that the segment information 550a located in the third register 330c may be moved to the fourth register 330d.

After receiving the completion signal tx_done, the state machine 310 sequentially switches to the transmission complete state and the idle state. Nevertheless, the second-type command C2_550 related to the NDP request 550 is present in the command queue 320. Hence, the command queue 320 may send a non-empty state indication CNE to the state machine 310 for triggering the state machine 310 to switch from the idle state to the popping state. When the state machine 310 is in the popping state, the state machine 310 may transmit the popping command POP for triggering the command queue 320 to pop the second-type command C2_550 related to the NDP request 550 to the TX 304, and then the state machine 310 switches from the popping state to the busy state. The TX 304 may retrieve the segment information 550a from the fourth register 330d based on the second-type command C2_550 related to the NDP request 550 for producing the NS response 550b. After transmitting the NS response 550b, the TX 304 correspondingly transmits the completion signal tx_done to the state machine 310, so as to trigger the state machine 310 to switch from the busy state to the transmission complete state and then switch to the idle state.

To sum up, the segment information of the first-type request (e.g., the ARP request) and the second-type request (e.g., the NDP request) are respectively latched in corresponding first-type register group and second-type register group and are retrieved at appropriate timings by the address resolution module provided by the embodiments of the disclosure, so as to correspondingly generate the first-type response (e.g., the ARP response) or the second-type response (e.g., the NS response) accurately and reliably. Further, in the embodiments of the disclosure, the first-type register group and/or the second-type register group may be configured as a multi-level cache structure, e.g., the first-type register group may include the first register and the second register, so as to improve the efficiency and reliability when the address resolution module responds to address requests.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A network device for processing various types of requests, the network device comprising an address resolution module, the various types of requests comprising at least one first-type request and at least one second-type request, the address resolution module comprising:
   a first-type register group, configured for caching segment information in the first-type request;
   a second-type register group, configured for caching segment information in the second-type request; and
   a command queue, configured for sequentially caching at least one first-type command related to the first-type request and at least one second-type command related to the second-type request, the first-type command being configured for triggering the segment information in the first-type request to be sent from the first-type register group, the second-type command being configured for triggering the segment information in the second-type request to be sent from the second-type register group,
   wherein the first-type command and the second-type command are generated by the address resolution module and are cached to the command queue, wherein an order of generating and caching the first-type command and the second-type command by the address resolution module is the order of receiving the first-type request and the second-type request by the address resolution module.

2. The network device as claimed in claim 1, wherein the address resolution module produces the first-type command when the segment information in the first-type request is cached in the first-type register group, and the address resolution module produces the second-type command when the segment information in the second-type request is cached in the second-type register group.

3. The network device as claimed in claim 1, wherein the first-type register group comprises a first register and a second register serially coupled to each other, and the segment information in the first-type request is firstly cached in the first register and then cached in the second register.

4. The network device as claimed in claim 3, wherein the segment information in the first-type request is cached in the second register if the second register is currently overwritable.

5. The network device as claimed in claim 4, wherein after the segment information in the first-type request is cached in the first register one cycle later.

6. The network device as claimed in claim 4, the address resolution module further comprising a state machine that sequentially operates in an idle state, a popping state, a busy state, or a transmission completion state, and when the state machine is in the idle state, the segment information in the first-type request is cached in the second register from the first register.

7. The network device as claimed in claim 3, wherein the segment information in the first-type request is cached in the second register from the first register if the address resolution module receives a completion signal after the segment information in the first-type request is cached in the first register.

8. The network device as claimed in claim 7, wherein the network device further comprises a transmitting end coupled to the address resolution module and configured for retrieving the segment information from the first-type register group or the second-type register group, and the transmitting end generates the completion signal after the segment information is retrieved completely.

9. The network device as claimed in claim 1, wherein the second-type register group comprises a third register and a fourth register, and the segment information in the second-type request is firstly cached in the third register and then cached in the fourth register.

10. The network device as claimed in claim 9, wherein the segment information in the second-type request is cached in the fourth register if the fourth register is currently overwritable.

11. The network device as claimed in claim 10, wherein after the segment information in the second-type request is cached in the third register one cycle later.

12. The network device as claimed in claim 9, wherein the segment information in the second-type request is cached in the fourth register from the third register if the address resolution module receives a completion signal after the segment information in the second-type request is cached in the third register.

13. The network device as claimed in claim 1, wherein the address resolution module further comprises a state machine, the state machine comprises an idle state and a popping state, and the state machine switches to the popping state from the idle state when the state machine receives a non-empty state indication transmitted by the command queue.

14. The network device as claimed in claim 13, wherein the state machine transmits a popping command to the command queue when the state machine is in the popping state, so as to trigger the command queue to sequentially pop the first-type command or the second-type command.

15. The network device as claimed in claim 1, wherein the command queue pops the first-type command or the second-type command to indicate the segment information cached in the first-type register group or in the second-type register group is going to be retrieved.

16. The network device as claimed in claim 15, wherein the first-type command or the second-type command indicative of where the segment information is retrieved.

17. The network device as claimed in claim 1, wherein the network device further comprises a transmitting end coupled to the address resolution module and configured for receiving the segment information transmitted from the first-type register group or the second-type register group, so as to produce a first-type response or a second-type response corresponding to the first-type request or the second-type request.

18. The network device as claimed in claim 17, wherein the transmitting end produces and transmits a completion signal to the address resolution module after completely transmitted the first-type response or the second-type response.

19. The network device as claimed in claim 17, wherein the first-type request is an address resolution protocol request and the first-type response is an address resolution protocol response, wherein the second-type request is a neighbor discovery protocol request and the second-type response is a neighbor discovery protocol response.

20. The network device as claimed in claim 1, wherein the address resolution module further determines whether to respond to an address request of the various types of requests, and the address resolution module discards the address request if there is no need to respond to the request.

* * * * *